Oct. 23, 1962 J. M. WAGNER 3,059,570
APPARATUS FOR INCISING AND IMPRINTING INFORMATION
Filed Jan. 11, 1960 7 Sheets-Sheet 1
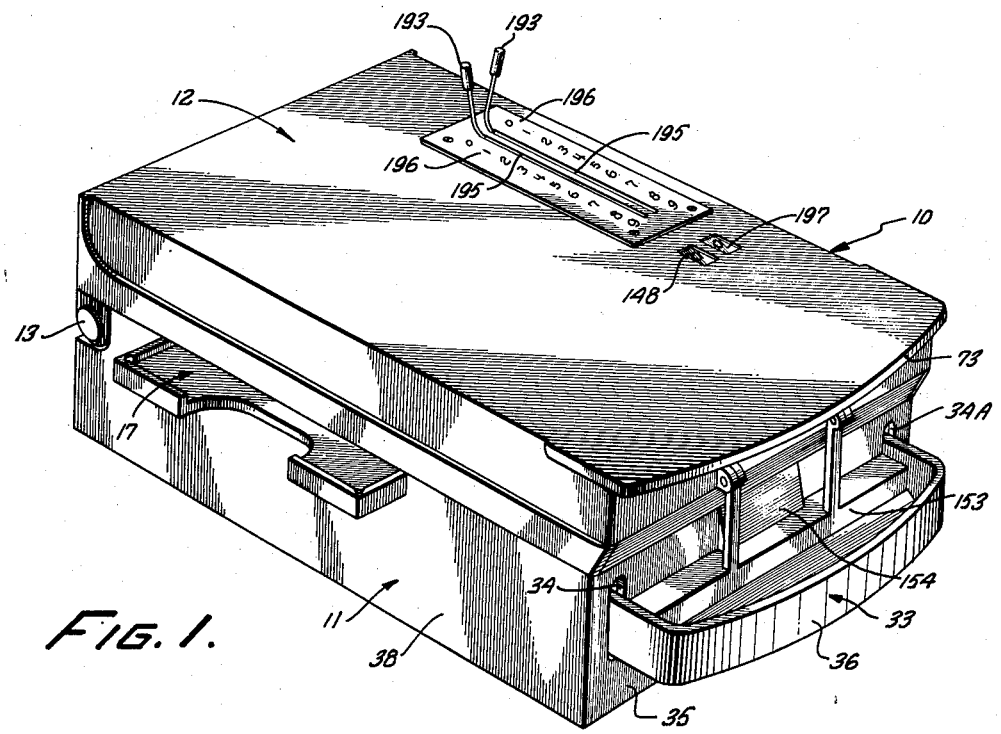
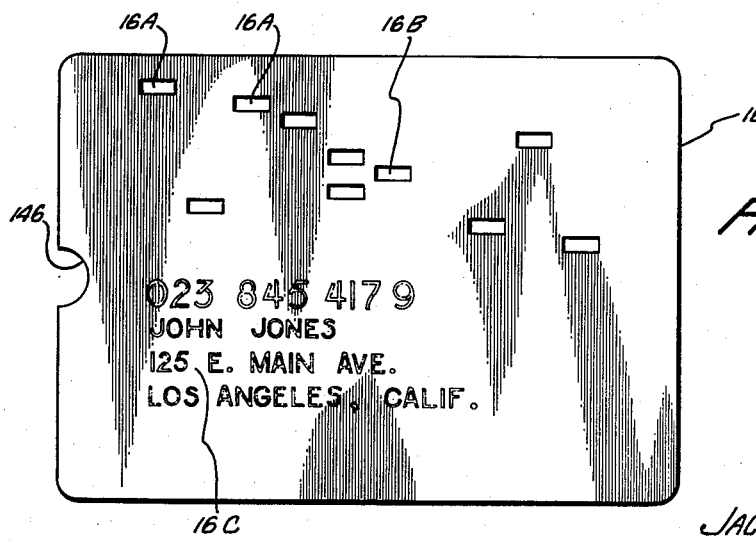
INVENTOR.
JACK M. WAGNER
BY
*Christie, Parker & Hale*
ATTORNEYS.

INVENTOR.
JACK M. WAGNER

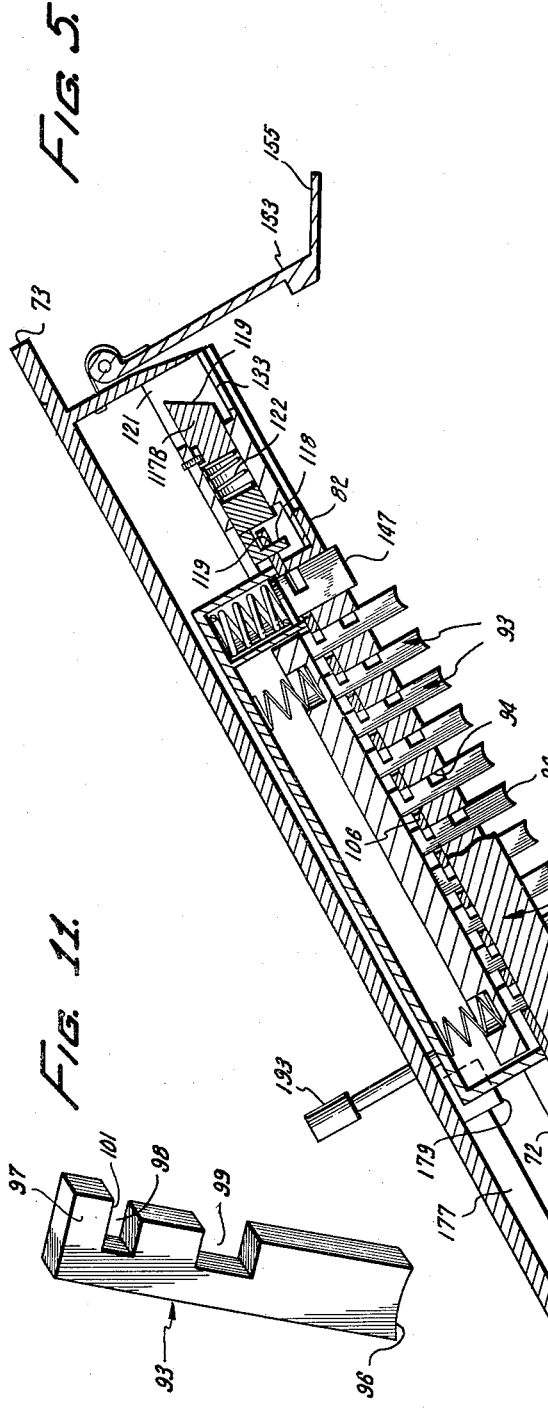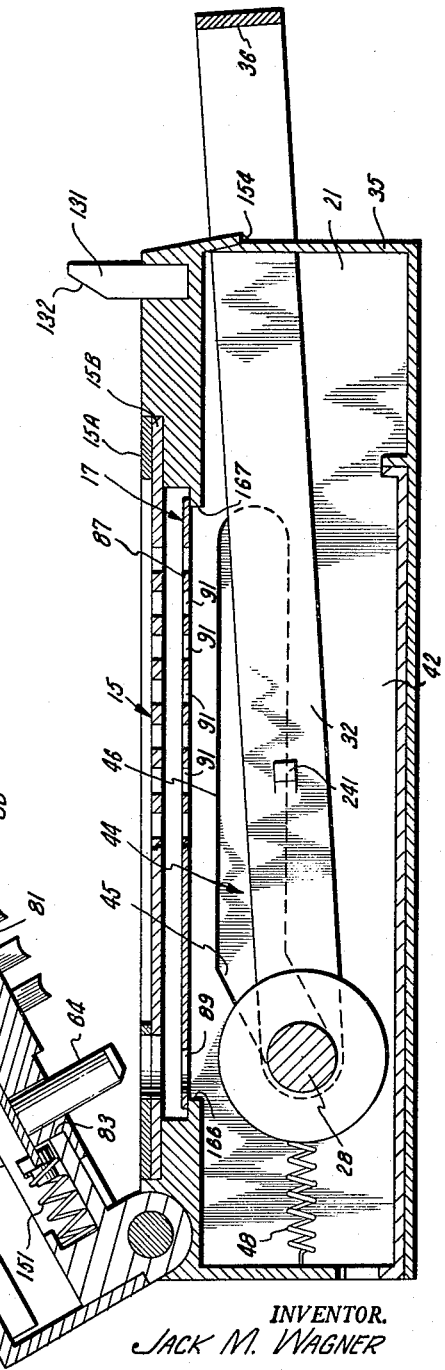

Oct. 23, 1962 J. M. WAGNER 3,059,570
APPARATUS FOR INCISING AND IMPRINTING INFORMATION
Filed Jan. 11, 1960 7 Sheets-Sheet 5

INVENTOR.
JACK M. WAGNER
BY
Christie, Parker & Hale
ATTORNEYS.

Oct. 23, 1962     J. M. WAGNER     3,059,570
APPARATUS FOR INCISING AND IMPRINTING INFORMATION
Filed Jan. 11, 1960     7 Sheets-Sheet 6
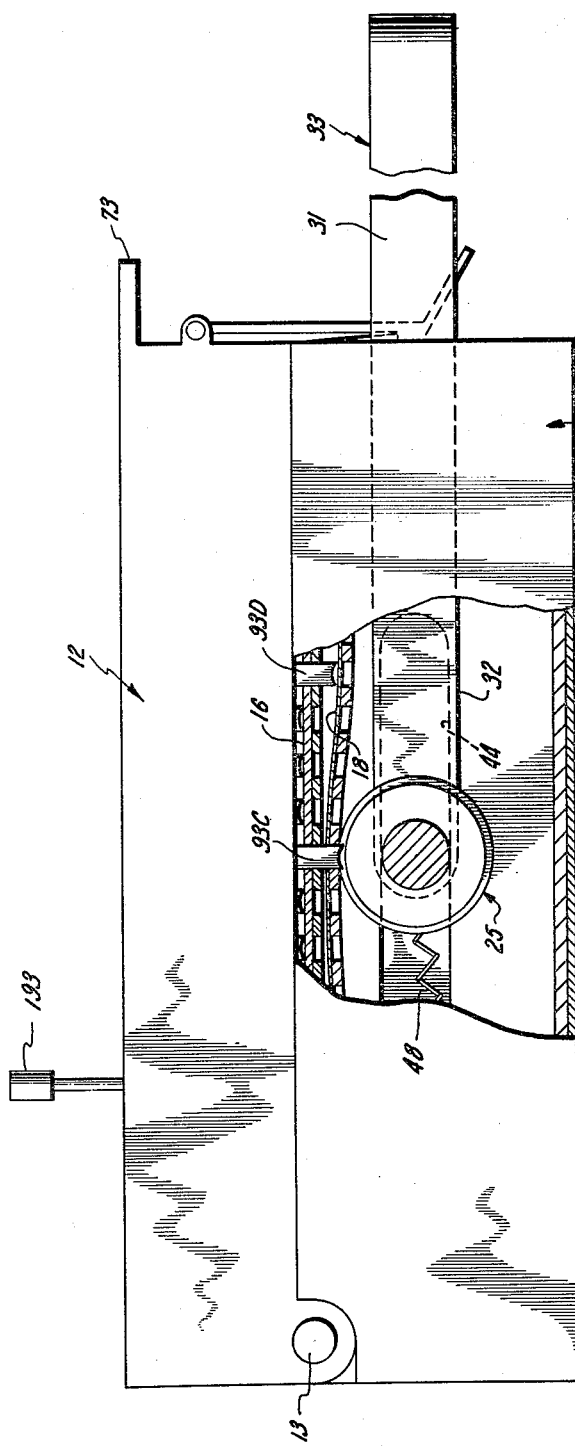
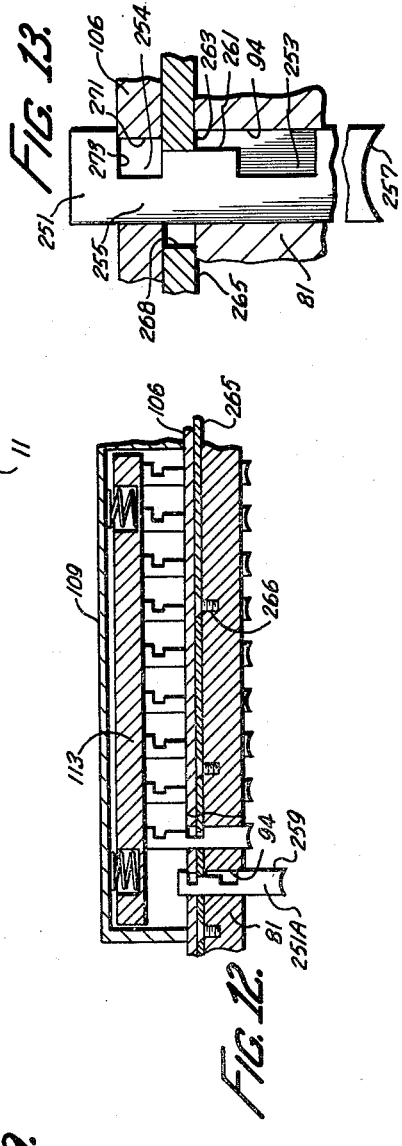
INVENTOR.
JACK M. WAGNER
BY
Christie, Parker & Hale
ATTORNEYS

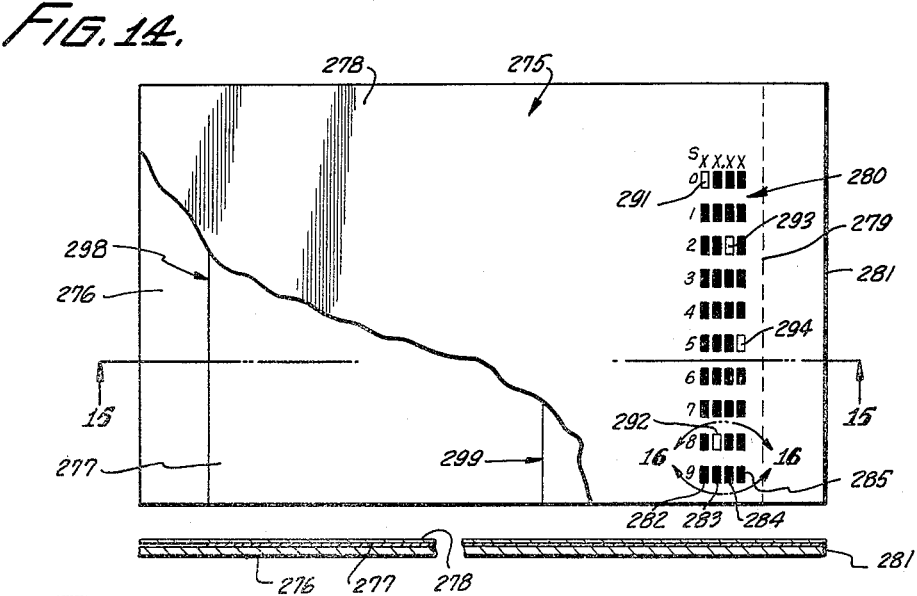
FIG. 14.
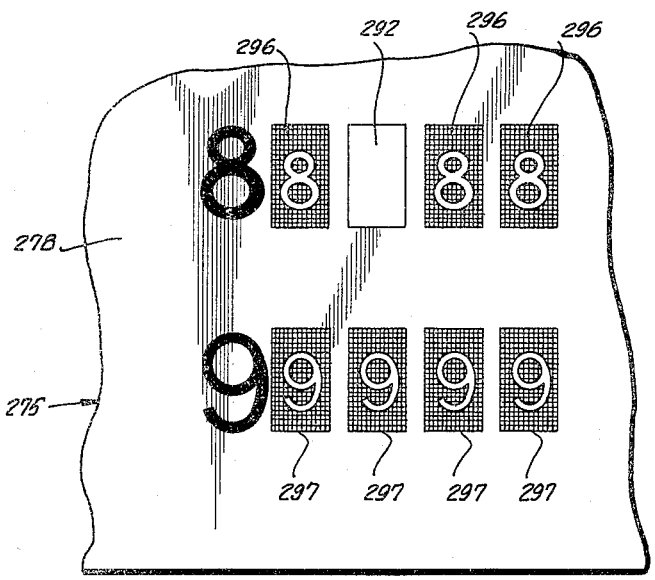
FIG. 15.
FIG. 16.

United States Patent Office 3,059,570
Patented Oct. 23, 1962

3,059,570
APPARATUS FOR INCISING AND IMPRINTING INFORMATION
Jack M. Wagner, 605 Santa Maria Road, Arcadia, Calif.
Filed Jan. 11, 1960, Ser. No. 1,791
25 Claims. (Cl. 101—19)

The invention relates to devices for recording data on tabulating cards, invoice card sets, and more particularly to such devices adapted to incise and/or imprint such data in accordance with a master card.

The rapid expansion of credit systems throughout the United States has resulted in much activity in the art of punching and imprinting data on record or tabulating cards. Several well-known machines exist for reading out data from cards punched in a predetermined pattern. Such machines have come into general use in the accounting departments of companies doing large credit business in which credit cards are used by individual credit customers. The use of punch card readout machines instead of human hands for posting individual invoices expedites account keeping tremendously. The conventional arrangement is for a credit card which is issued to each customer to contain embossed information such as the name, address and account number of the customer. In addition, the card may have incised data including the account number or other information.

In order for this information to be transferred rapidly when sales are made at the retail level, devices have been developed for transferring both the embossed data and the incised data to a tabulating card or invoice blank. Conventionally, the invoice blank has a tissue copy and a tabulating card copy separated by a double-faced carbon sheet. The tissue copy is given to the customer for his records and the tabulating card is sent to the accounting department of the merchandiser. In order for the system to function properly, the embossed information must appear on both the customer's tissue and the merchandiser's tabulating card.

The requirements for the punched holes or incised data are exacting. If the pattern of punches varies even slightly from the imposed pattern of the readout mechanism employed, malfunctions occur which interfere with proper posting and require tedious, expensive human reading of the incised data. Therefore, it is imperative that precise coordination exist between the punches in the device transferring information at the sales level and the credit or master card carried by the individual customer.

The embossed portions of different individual cards may vary several thousandths of an inch in embossed height. While this variation is small, it is sufficient to cause frequent improper printing when the master card is brought into printing contact with the invoice blank. In conventional imprinting devices, both the imprinting contact and the incising engagement occur at the same time to facilitate rapid transfer of the data from the individual master card to the invoice blank or tabulating set. The pressures required for proper embossing and for incising are not necessarily the same, and it has been therefore difficult to achieve optimum printing and incising pressures even without regard for the added difficulty stemming from variations in embossed height of imprinting characters.

I have invented apparatus which overcomes the difficulties outlined above. The inventive apparatus is not only capable of transferring precisely both embossed and incised data, but is also capable of more rapid and foolproof operation by unskilled operators. This last is an important consideration since one of the drawbacks of credit card transactions is the amount of time consumed in utilizing conventional apparatus properly to prepare the necessary sales invoice. The invention contemplates apparatus for transferring data from an incised and embossed master to an invoice set or a blank tabulating card, which comprises a static base, a punch carriage movable with respect to the base and receptacles for the master or credit card and the invoice blank. The invoice blank receptacle is coordinated with the receptacle for the master card. A plurality of first data punches adapted to engage the master card are preferably carried within the punch carriage. A plurality of second data punches may be also carried within the punch carriage and are adapted to contact the invoice blank also. The contemplated apparatus further comprises roller means for bringing the embossed portion of the master into printing contact with the invoice blank and means for locking selected data punches into incising position in accordance with the incised master card. The apparatus also includes means for effecting incising engagement between the data punches and the blank. Means may also lock selected second data punches into incising position. The apparatus may also include means for effecting incising engagement between the second data punches and the invoice blank. Preferably additional means locate the master card in proper registration with the pattern of the data punches in the punch carriage during the incising operation.

The plurality of second data punches are not included in conventional data transfer apparatus. However, in combination with the plurality of first data punches, they constitute a device capable of recording complete sales data on any transaction. The second data punches are preferably utilized to incise the amount of the purchase in the invoice blank. Heretofore, price information on the transaction has been manually recorded by the sales clerk. Since the information written on the invoice by the clerk cannot be translated by the posting mechanisms conventionally "reading" the incised markings on the invoice, human operators are required to punch or otherwise transfer this written data to the invoice blank or card when it is received at the accounting department. This, of course, entails added costly operations which interfere with the efficient and preferably inexpensive operation of any credit system.

It is often advantageous for the operator to be able to read the incised data. The invention includes a tabulating card or invoice blank which is used in conjunction with the other apparatus of the invention to achieve this end. In combination with apparatus for incising information from an incised master card, the inventor contemplates a tabulating card or invoice set having indicia which indicate visually from the incised pattern the information embodied in the incised pattern. This combination enables the individual holder of the master card, or others, to directly comprehend the information punched in his portion of the invoice set. It is therefore possible to eliminate handwritten prices, for instance, from the customer's receipt or invoice portion.

In the preferred form of the invention, the operations of incising information represented by selected data punches of both the first and second pluralities and the imprinting operation are performed by one manual manipulation. This manipulation has best been accomplished by a pressure roller which brings the data punches and the invoice set into incising engagement at the same time that the master and the invoice set are brought into printing registry. As stated before, the pressure requirements for these several operations are not necessarily the same. This is due in part to the universally encountered minute variations in height of the embossed data on the master card. Therefore, in the preferred form of the invention, the pressure roller is a segmented one, capable of radial displacement with respect to its axis in some of the segments. The roller segments which contact the perforated die plate to lift the invoice blank, including the tissue and the tabulating card, against the punches need not be displaceable radially. The various segments of the printing portion of the roller have peripheral portions capable of displacement with respect to the axis of rotation. Displacement with respect to the axis may be opposed by resilient cores within each of the roller segments. Such cores may be rubber, or coil springs, or like resilient means for resisting the radial displacement of the periphery.

An important part of the invention resides in the means for locking selected first data punches in incising position. The punch carriage moves the punches toward the static base bearing the master card and into engagement with the master card and the holes incised therein. The battery of data punches in the punch carriage is arranged in a pattern coordinated with the readout or tabulating machine for the particular data punch system being used. The master card is located in the static base so that the general pattern of information represented by punched holes therein coincides with the general pattern of the data punches. Therefore, when the punches are brought into contact with the master card, certain of the punches encounter no resistance and pass through the already incised master card holes. Others of the punches are supported by the unpunched surface of the card. As punch carriage movement toward the static base continues, certain of the punches are displaced with respect to their carrier. At the instant that the punch carriage is in position to be latched to the static base, a selector plate is moved to lock into incising position those punches which have maintained their relative position with respect to the punch carriage. The punches supported by the master card are at that same time free to move with respect to the carriage. Therefore, when the roller which accomplishes the transfer of data from master card to invoice set or blank lift the invoice blank and the card against the thrust of the punches, the unselected punches do not resist the upward thrust but are lifted by the master card and do not punch through the card.

Means are provided which tend to move the invoice card into registry within its receptacle when the punch carriage is moved into position against the static base. Therefore, if the invoice blank is placed in its receptacle without regard for the registry surface, the means provided tends to thrust it against a receptacle registry surface as the carriage is moved against the base. Other registry means insure that the punch carriage, with its precisely patterned punches, achieves proper registry with the incised master card in its receptacle upon the static base.

These and other advantages of the invention are apparent in the following detailed description and drawings, in which:

FIG. 1 is a perspective view of the preferred form of the invention in which the punch carriage and the static base are in closed position;

FIG. 2 is a representation of a conventional individual master or credit card in which embossed and incised data are apparent;

FIG. 5 is a longitudinal sectional elevation taken through the embodiment of FIGS. 1 and 4 with the punch carriage displaced from the static base;

FIG. 9 is a side elevation of the embodiment of FIG. 1 partly in section and showing the data transfer operation of the inventive apparatus;

FIG. 11 is a perspective view showing details of a typical first data punch;

FIG. 12 is a fragmentary sectional elevation illustrating an alternate embodiment of the invention including an alternate first data punch;

FIG. 13 is an enlarged detail of the data punch assembly of FIG. 12;

FIG. 14 is a view, partly broken away, of a preferred invoice or tabulating card set in accordance with the invention;

FIG. 15 is a sectional view taken along line 15—15 of FIG. 14; and

FIG. 16 is an enlarged view taken in the area 16—16 of FIG. 14.

Figure 7:
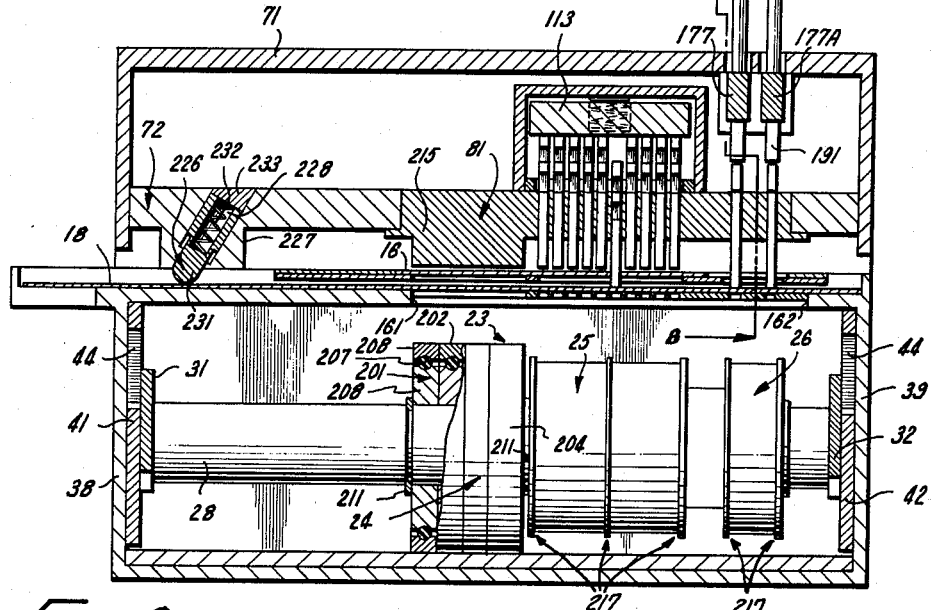
FIG. 7 is a transverse sectional elevation taken along line 7—7 of FIG. 6.

The embodiment of the invention shown in FIGS. 1–9 is the preferred form of the invention. In that embodiment, a data punch machine indicated generally by the character 10 has a static base 11 and a movable cover or punch carriage 12. Preferably, the punch carriage is pivotally mounted with respect to the static base by hinge pins such as pins 13 located at the back upper edge of the static base in FIG. 1. The punch carriage holds a set 14 of first data punches and a second set 14A of second data punches. The static base has a first receptacle 15 for a customer's credit or master card 16 which is shown in FIG. 2. The static base also has a second receptacle 17 located below the first receptacle and receives a tabulating card on invoice blank 18 shown in FIG. 3. The static base is largely rectangular in configuration and has an enclosed volume 21 below the master card and invoice blank receptacles. Volume 21 contains a pressure roller assembly 23 which includes a printing roller portion 24, a first punch roller segment 25, and a second punch roller segment 26. All of the roller segments are supported by a roller axle 28 extending between spaced arms 31, 32 of an actuating handle 33. Arms 31, 32 extend exteriorly of the static base through apertures 34, 34A in a front end wall 35 of the base. A hand grip 36 extends between the arms exteriorly of the base. The grip and arms may be formed of a single piece.

Figure 6:
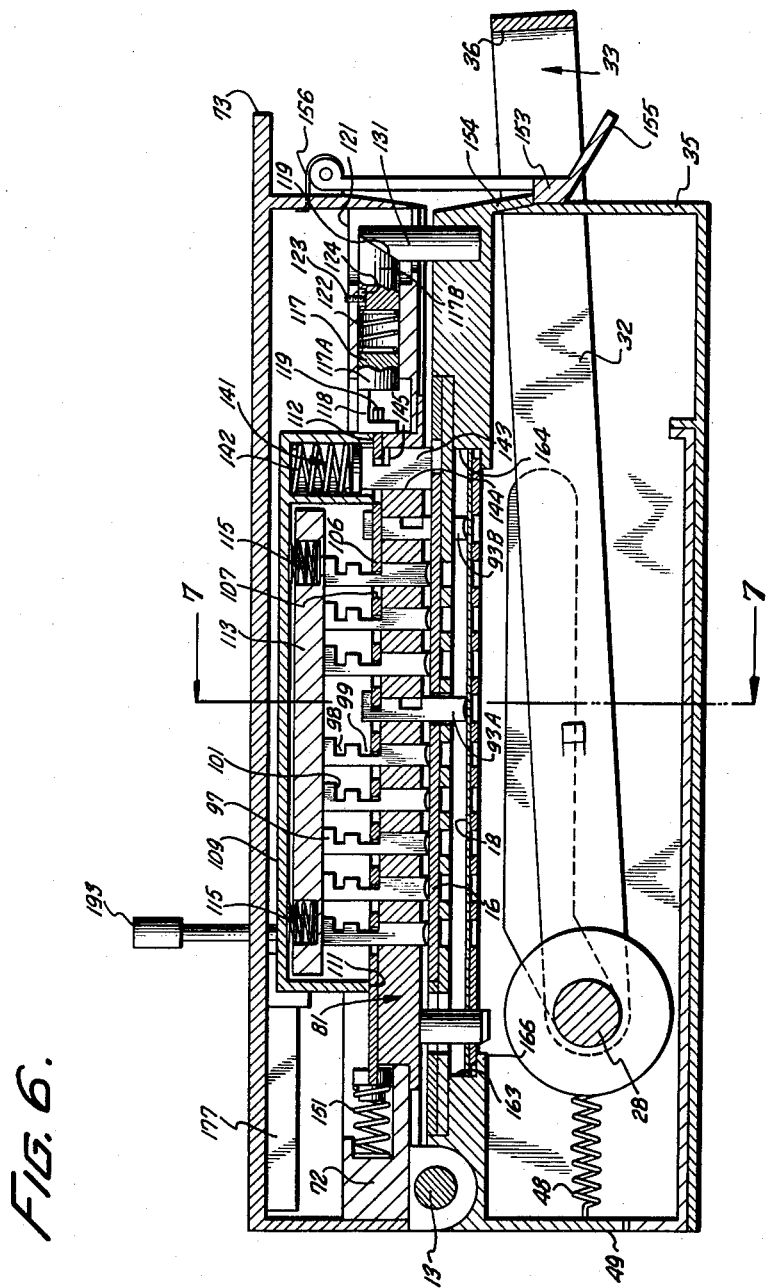
FIG. 6 is a longitudinal sectional elevation showing the relationship of the punch carriage and the static base when they are latched together in operative position.

Parallel side walls 38, 39 of the static base support transversely spaced track members 41, 42, respectively. In each track member is a roller track 44 which has an upwardly slanting portion 45 and a horizontally extending portion 46. Projecting ends of the roller axle protrude beyond the actuating lever arms into the spaced track portions. In non-actuating position, the axle protrusions reside in the lower portions of track sections 45, as shown in FIGS. 5, 6 and 7.

A pair of springs, such as spring 48 (see FIG. 5), are fastened to a back wall 49 of the static base and extend to axle 28 or to arms 31 and 32 and are fastened thereto. These springs oppose the forward pull of the actuating handle. The springs restore the pressure roller to rest position (FIGS. 5 and 6) when the roller has accomplished the transfer of data from the sets of data punches and the embossed portion of the master card to the invoice blank.

Figure 4:
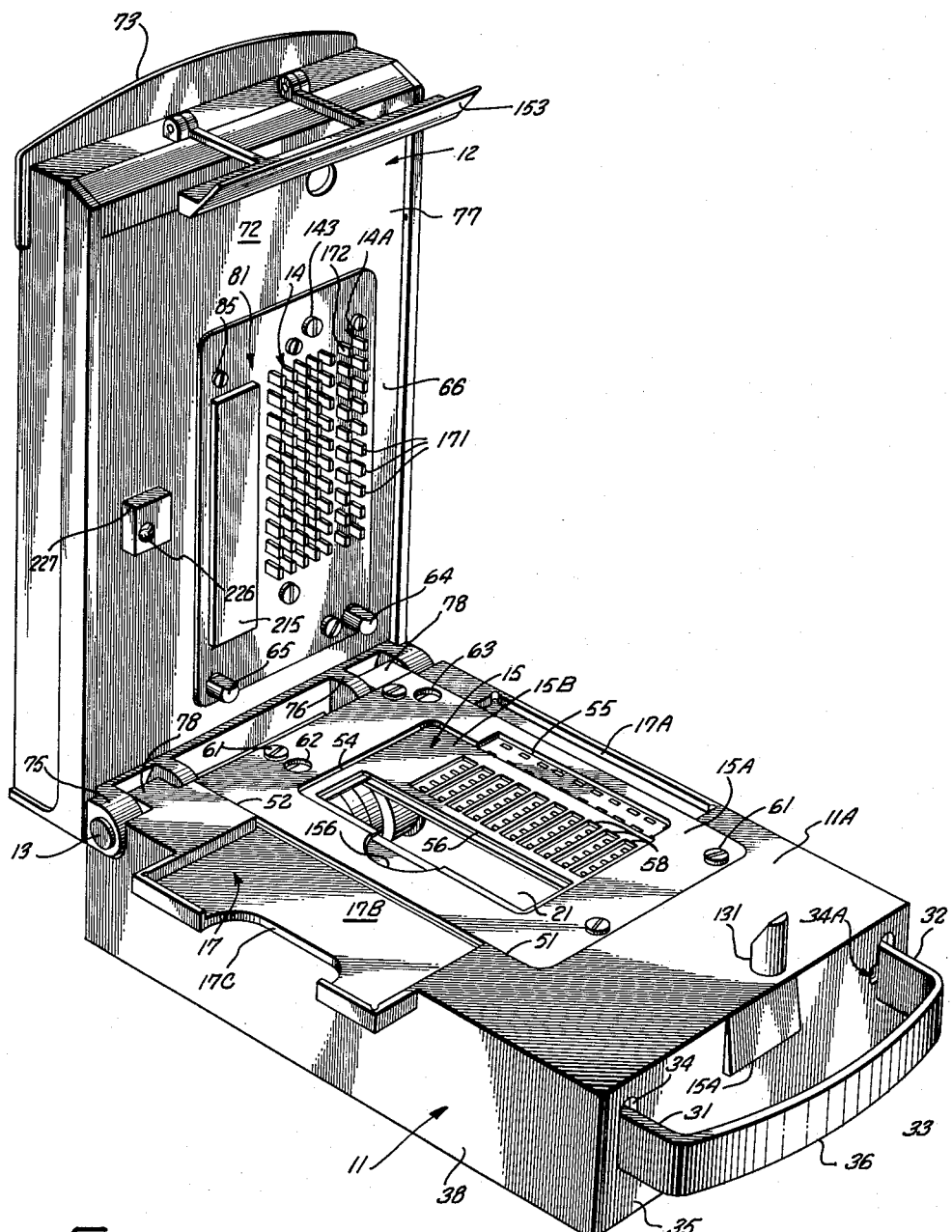
FIG. 4 is a perspective view of the apparatus in FIG. 1 in which the punch carriage and the static base are separated in loading position to show the receptacles for the master card and the invoice blank.

The receptacles for the master card and the invoice blank are preferably supported by the static base. As can be seen in FIG. 4, receptacle 17 is formed in the upper surface of the static base. The receptacle has vertical side walls around most of its perimeter to contain the invoice blank, with side wall 17A being a registry surface for an end of the invoice blank. A bottom surface 17B upon which the blank rests extends from end wall 17A transversely across upper face 11A of the static base and outwardly beyond side wall 38 of the base. The extending portion of surface 17B has a finger grip notch 17C for gripping the invoice blank or tabulating card to remove the blank or card after the information has been transferred from the master card to the blank.

Upper surface 11A of the static base has shallow recesses 51, 52. The recesses are substantially rectangular in configuration and disposed on opposite sides of second receptacle 17. A pair of laminated first receptacle plates 15A, 15B bridge across second receptacle 17 from recess 51 to recess 52 and seat in the recesses. The receptacle plates are an expeditious means of forming the first receptacle. The first receptacle can, by complicated casting, be made an integral part of the static base. Alternatively, the first receptacle configuration may be formed in a single plate rather than in the two laminations 15A, 15B. Each of these alternative means for forming the receptacle are relatively expensive compared to a laminar receptacle.

Receptacle 15 is bounded by the walls of a cavity 54 in top receptacle plate 15A. Cavity 54 is substantially identical with the configuration of master or credit card from which information is to be transferred, and holds the card in one position. A wall of the cavity remote from finger notch 17C is relieved by a rectangular indentation 55 forming a clearance hole for second set 14A of data punches. Upper receptacle plate 15A may be provided with a finger access notch 15C to facilitate removal of the master card.

Lower receptacle plate 15B has a rectangular opening 56 near the finger access notch 15C. Opening 56 is oriented with respect to the master card which fits into the first receptacle so that the embossed information on the master card aligns with the area defined by the opening. The second or lower receptacle plate also has a plurality of parallel rectangular apertures 58 which coincide with the transverse rows of data punches of set 14 located in the punch carrier.

The plates are secured to the upper surface of the static base by a plurality of flush head screws 61. A pair of clearance holes 62, 63 penetrate the receptacle plates near the hinged axis of hinge pins 13. The clearance holes allow free passage of a pair of registry pins 64, 65 which protrude from a lower surface 66 of punch carriage 12.

The punch carriage comprises in the main an outer rectangular box 71 secured by conventional means to a punch support plate 72 recessed in the box near the bottom edges of the side walls of the box. Box 71 has a forwardly projecting lip 73 at its top which acts as a hand grip for manipulating the punch carriage.

Support plate 72 is comparable in area to upper surface 11A of the static base. The support plate has a pair of integrally formed hinge clevises 75, 76 extending from its lower surface 77. Each of the clevises receives a hinge pin 13 which is mounted within one of a pair of lugs 78 of the static base. The punch carriage may thus be swung toward and away from the base. Lower face 77 of the punch support plate is substantially parallel to upper surface 11A of the static base when the carriage is moved into operating position with respect to the base.

A substantially rectangular punch guide block 81 is recessed centrally of the support plate. The guide block has a bottom flange 82 which overlaps an aperture 83 in the support plate. A plurality of screws 85 extend through the flange into the support plate to hold the guide block in position.

The position of the guide block is very important to insure precise functioning of the inventive apparatus. Registry pins 64, 65 are fixed in the guide block. The registry pins extend through the previously described clearance holes 62 and 63 of the static base. When the punch carriage is moved into data transfer position against the static base, the pins extend downwardly through the receptacle plates to a die plate 87 supported in the base. Registry holes such as hole 89 in the left end of the die plate, as seen in FIGS. 5 and 6, insure proper registery between the die plate with its plurality of shearing apertures 91 and set 14 of first data punches arranged within guide block 81.

The individual data punches 93 of first set 14 are illustrated as arranged in rows of ten punches each extending normal to the hinge line of the static base and the punch carriage. While only five rows have been shown, any number of rows may be utilized. The number of rows in fact depends upon the particular readout device employed for the data punch card of the invoice blank to which the punches transfer information. The arrangement and spacing of the punches is determined by this readout device. Each punch 93 is placed within the guide block in a slide path 94 to insure that the punch remains in the precise pattern imposed by the readout device. This same distribution pattern is imposed upon apertures 91 of die plate 87.

As can best be seen with respect to FIGS. 5, 6, each of data punches 93 of the first set is formed from a substantially rectangular hardened metal piece. Each punch 93 has an incising end 96 and a locking end 97. The incising end, in conventional fashion, is arcuately shaped so that shearing edges are formed at the bottom of the punch. The locking end of each data punch has a pair of notches 98, 99. Notch 99 has a greater extent along the axis of the punch than does notch 98. Notch 98 has an extending upper wall 101 which gives the locking end a width greater than the width of a slide path 94 so that the individual punches do not fall through the guide block.

In any data punch device, means must be provided by which only certain of the data punches of any plurality are operative when the information represented by the incised area of the master card is to be transferred to the invoice card blank. The apparatus of the invention is a smoothly operating one which uniquely locks only the selected punches in incising position in accordance with the data represented in the master card by its apertures. Smooth operation derives from the apparatus immediately associated with the guide block. Guide block 81 projects into a large recess 104 in the top portion of support plate 72. A selector plate 106 having a plurality of openings 107 matching the number of first data punches 93 residing in the guide block is mounted to slide across the top surface of guide block 81. The length of each of the openings 107 is equal to the width of a slide path 94, while the width of the opening is substantially equal to the thickness of a data punch 93. A box housing 109 sits astride the selector plate and overlies all of the first plurality of data punches 14. Apertures 111 and 112, at the left end of the housing and at the right end of the housing, respectively (as seen in FIGS. 5 and 6), guide the selector plate as it is moved across the top of guide block 81. A metallic weight bar 113 is spring loaded by a plurality of compression springs such as springs 115 against the tops of all of the first plurality of data punches 93. The weight bar also resides within housing 109. The weight bar tends to push the data punches along the guide block slide paths 94 so that they extend below the bottom surface 77 of the support plate in the manner shown in FIGS. 4 and 5. The weight bar may be of one piece, or be made of a plurality of bars, one for each row of data punches.

The selector plate 106 is moved across the top of the guide block by an actuating pin 117. The pin has two portions: 117A bearing an L-shaped tang 118 depending downwardly through a hole 119 to engage the selector plate, and a contact portion 117B having a cam surface 119. Contact portion 117B extends into a second recess 121 in the support plate. A compression spring 122 intervenes between the adjacent faces of the two actuating pin portions. The L-shaped tang holds portion 117A in relatively fixed position within a longitudinal bore 128 which supports the actuating pin. A set screw 123 extends into a slot 124 in portion 117B to hold in fixed radial relationship so that cam surface 119 maintains a fixed orientation with respect to bottom surface 77 of the support plate despite longitudinal displacement of the two pin portions.

A post pin 131 is fixed in static base 11. The post pin protrudes above the static base and is adapted to engage cam surface 119 of the actuating pin with a cam surface 132 when the punch carrier is brought into closed position so that the data punches come to rest upon the master card in place in first receptacle 15.

A port 133 in the support plate 72 provides access for post pin 131 to enter second support plate recess 121 and engage cam surface 119 of the actuating pin. The resultant of the engagement of actuating and post pins 117 and 131 is a lateral thrust of the actuating pin, and because of the L-shaped tang, selector plate 106 is also shifted laterally along guide block 81. FIG. 5 shows the position of the selector plate prior to actuation by the engagement of the two pins. In FIG. 6, master card 16 of FIG. 2 is in place in first receptacle 15. Card 16 has a plurality of incised punch holes 16A distributed within the standard punch card pattern. The apertures or punch holes 16A in this illustrative case indicate a card serial number 0238454179. This information is to be transferred to the tabulating card or invoice blank 18 of FIG. 3. In the positions of FIG. 6, the punch hole in master card 16 representing the digit 5 has allowed the data punch 93A to protrude through the punch hole 16B and rest upon the upper surface of the invoice blank 18. Similarly, the data punch 93B in FIG. 6 is shown in contact with the upper surface of blank 18. The rest of the data punches in that row within the first plurality rest upon the unpunctured surface of the master card. They are lifted from the protruding position of FIGS. 4 and 5 against the weight and spring loading of weight bar 113. The selector plate has been shifted from its inoperative position as shown in FIG. 5 to lock position as shown in FIG. 6. The leftward shift of the actuating pin 117 has moved the selector plate so that the apertures 107 therein no longer align with the slide paths 94 of guide block 81. Therefore, the metal adjacent the apertures 107 have shifted into slots 98 or 99 of the data punches and precludes movement upwardly of data punches such as 93A, 93B which have dropped through the punch holes 16A or 16B of the master card. Notches 99 of each of the data punches 93 are wide enough to give some freedom of movement about that part of the selector plate which impinges on the slot when actuating pin 117 is shifted leftward in FIGS. 5 and 6.

The preferred embodiment of the invention as illustrated in FIGS. 5 and 6 contains a sensing pin assembly 141 which makes the punch selector mechanism inoperative unless a master card resides in the first receptacle. The box housing 109 contains a recessed compression spring 142 bearing downwardly against a sensing pin 143. The sensing pin may be square in shape and fit into a broached hole 144 or may be keyed within the guide block so that orientation of a pin notch 145 is maintained with respect to the selector plate. The selector plate is apertured to fit around the sensing pin. As can be seen in FIG. 5, when the actuating pin has not engaged post pin 131, the selector plate impinges against a portion of the sensing pin above the notch. Thus, although a lateral thrust is imposed upon the actuating pin by its contact with post pin 131, the compression spring 122 of the actuating pin absorbs the thrust and no lateral motion of the tang against the selector plate can take place. However, as the carrier is pivoted into engagement with the static base, bottom face 147 of the sensing pin comes to rest upon the master card. Thus the final travel of the punch carriage into engagement with the static base lifts the sensing pin against spring 142 so that the selector plate can shift leftwardly in FIG. 6 and lock the first data punches in the positions they have assumed with respect to the incised master card. Those punches which "find" no incised data punch holes in the master card are locked in upward position by engagement of the selector plate with data punch notch 99 of each of these punches. Conversely, the data punches which "find" incised punch holes in the master card continue through the card and through the apertures in bottom plate 15B of the first receptacle and are locked in position as they rest on top of invoice blank or tabulating card 18. They are maintained in this position by the entry of the selector plate into notch 98.

The end of the selector plate remote from the actuating pin impinges against one or more compression springs, such as spring 151 of FIGS. 5 and 6. The spring opposes the motion of the actuating pin, and when the punch carriage is lifted away from the base, the selector plate is thrust backward into unlocked position by the pressure of the spring or springs 151.

Figure 3:
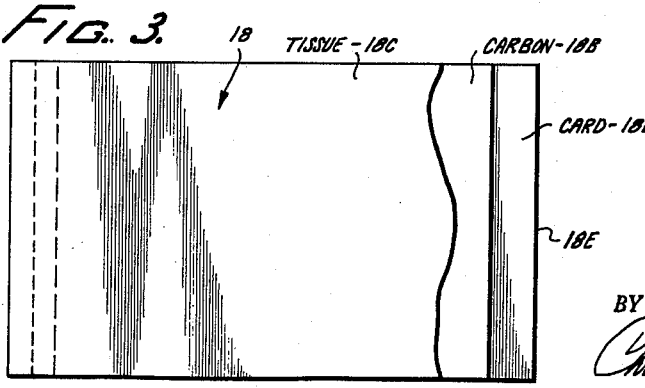
FIG. 3 is a plan view partly broken away of a conventional invoice blank utilized in credit card systems.

The carriage for the punches bears a spring loaded hinged latch 153 which depends below the surface of the support plate of the punch carriage. The latch 153 engages a tang 154 on end wall 35 of the static base. The latch has a handle portion 155 which may be used to press the latch into engagement with the tang. However, it is preferable to use a spring 156 to load the latch into engagement. When in latched position, the carriage is in position for transfer of data from the master card to the invoice blank or tabulating card. As reference to FIG. 2 will show, in addition to incised punch holes such as the holes 16A, 16B, the conventional master card for use in credit tabulating systems has embossed indicia such as the numbers and letters shown in FIG. 2. The invoice blank or tabulating card, as shown in FIG. 3, conventionally includes a tabulating card 18A, a double faced carbon 18B and a tissue 18C. The tissue is conventionally that portion of the invoice blank which the credit customer receives. The object of the embossed information on the master card is to make an impression upon both the tissue and the card 18A by means of the double faced carbon. The tissue is usually translucent so that the embossed information is back printed on the tissue and visible because of its translucency from the front of the tissue. The master card is put into the first receptacle so that the embossed area of the master card coincides with rectangular hole 56 of the first receptacle. As inspection of FIG. 7 will show, the second receptacle floor 17B is open transversely a distance equal to opening 56, plus the extent of rectangular openings 58 and the transverse dimension of relief recess 55. The area of this opening is defined by longitudinal walls 161, 162 (see FIG. 7) and transverse walls 163, 164 (see FIG. 11). It is through this opening defined by the transverse and longitudinal walls that the data punches of both the first and the second plurality and the embossed portion of the card are contacted by the die plate 87 which implements the imprinting and incising of data on the invoice blank or tab card. Die plate 87 is supported by transverse lips 166, 167 which protrude inwardly from transverse walls 163, 164 below second receptacle 17, while at rest.

The die plate extends transversely from the area adjacent opening 56 to the area encompassed by indentation 55. As pointed out heretofore, indentation 55 is clearance for second plurality of data punches 14A depending from the punch carriage. The second data punches are similar in lower configuration to the first plurality of data punches 14. However, in the illustrative embodiment, their function is different. Each of the individual punches 171 of the second plurality 14A may be put into incising condition manually at the election of the operator. Two rows of punches 172, 173 have been illustrated. In the preferred embodiment of the device of FIGS. 1–9, these rows would be used to indicate the amount of the sale for which the credit card is used. Normally, three to five rows similar to rows 172, 173 would be provided in a device such as that illustrated, but the number of rows has been reduced to simplify illustration and explanation.

Figure 8:
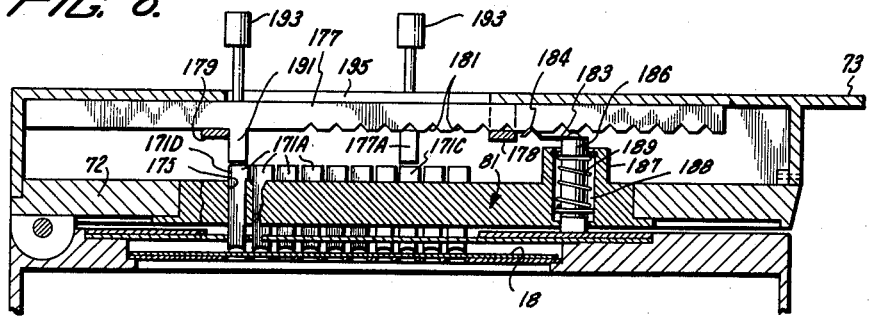
FIG. 8 is a fragmentary sectional elevation taken along line 8—8 of FIG. 7 to show the second data punches.

As can be seen in FIG. 8, each of the data punches 171 extends through a slide path 175 in guide block 81. Each of the data punches 171 of the second plurality 14A has an enlarged head portion 171A slightly larger than the cross-sectional area of the slide path 175 to preclude the individual punch from falling through the guide block. Interposer bars 177 are slidably mounted in metallic loops 178, 179 depending from the upper surface of box 71. There is an interposer bar for each row of punches 171. A plurality of notches 181 are distributed in the lower surface of each bar 177. The notches are spaced apart along the length of the bar an increment equal to the spacing between the data punches. These notches register with a comb spring 183 which has V-shaped trough sections 184 which extend transversely of the punch carriage to span the interposer bars 177.

The comb spring 183 is fastened to and supported by a detent pin 186, spring loaded within a boss 187 and a bore 188 extending downwardly through guide block 81. Detent pin 186 projects beneath the surface of the guide block. This whole assembly is pinned or keyed to maintain orientation while allowing up and down movement. When the cover is closed as shown in FIG. 8, the pin 186 contacts first receptacle plate 15A and the pin and comb spring are lifted against the pressure of a spring 189 so that the comb spring 183 may engage notches 181 of the interposer bars. The comb spring and detent pin assembly comprises a unique combination which not only guides and locks the interposer bars into position, but also acts to open or set the cover slightly ajar as latch 153 is kicked off by final operation of the machine. This terminal action also removes the comb spring from contact with the notches in the interposer bars. When the cover is opened to the upward position, gravity causes the interposer bars to "cancel out" by sliding to the left, or downward. Thus, there is no need for the operator to return the interposer bars of the second plurality of data punches to their original position after each operation. This also precludes the operator from inadvertently transferring the data from a prior sale to an invoice blank for a second sale.

The interposer bars each have a depending lug 191 which lock the selected data punches of the second plurality in incising position. In FIG. 8, second interposer bar 177A has been moved to locking position in contact with a second data punch 171C which conventionally would represent the digit 7. First interposer bar 177, on the other hand, has its locking lug 191 in registry above second data punch 171D which conventionally represents zero. Thus, when the data transfer operation is completed in this exemplary setup, the tab card or invoice blank will bear indicia indicating that 7 cents were expended on the sale.

Interposer bars 177, 177A are manipulated by means of levers 193 fixed to each interposer bar and extending upwardly through longitudinal slots 195 in the top of punch carriage box 71. Bordering each slot are numerals 196 which are spaced along the slots in accordance with the movement of the levers 193 necessary to advance the locking lug 191 of the given interposer bar into proper position above a second data punch 171. An additional means of insuring that the interposer bars are properly placed to lock the selected second data punch in proper incising condition is to provide a pair of windows 197, 198 in the top of the punch carriage above the interposer bars 177 as shown in FIG. 1. Thus, if the top surface of each interposer bar bears numerals from 0 to 9, the windows themselves show the price which it is desired to incise in the tab card when the levers 193 are moved to the proper position.

Turning now to the operation of the device, the preferred imprinting and incising roller assembly 23 of the illustrative device is shown best in FIG. 7. In that figure, roller axle 28 is shown with its protruding ends residing in the lower portion of track portion 45. This is the normal non-operating position of the roller assembly. As previously described, the roller assembly includes a printing roller 24 for embossed areas of the master card and first and second incising rollers 25 and 26. The first and second rollers may be integral. The roller sub-assembly 24 is slightly larger in diameter than the sub-assembly rollers for the incising operation. Imprinting roller portion 24 has four roller segments 201, 202, 203 and 204. The number of segments coincides generally with the number of rows of embossed indicia on the card from which data is to be transferred. Each of the roller segments has a relatively hard outer ring 206, a resilient core 207 which, in the preferred embodiment, may be a conventional rubber O ring, and a hard bearing ring 208 journalled on roller axle 28. The four segments of the imprinting roller are held in place by a pair of conventional C-rings 211. The width of the imprinting roller is slightly less than the width of the aperture 56 so that the roller may be displaced upwardly through this aperture to bear the invoice blank into printing contact with the embossed information on the master card. A back-up pad 215 (see FIG. 4) depends below the outer surface of guide block 81, and when the punch carriage is brought into close proximity with the base, the back-up pad rests on the embossed area of the master card so that the proper imprinting pressure may be applied to the master card and the invoice blank.

Preferably, each of the incising roller sub-assemblies is of a solid metallic construction, with narrow pressure rings 217 projecting beyond the roller periphery to induce the punching action. Conventional C-rings or other means may be used to maintain the precise position of the imprinting and incising rollers transversely of the roller assembly axle.

Figure 10:
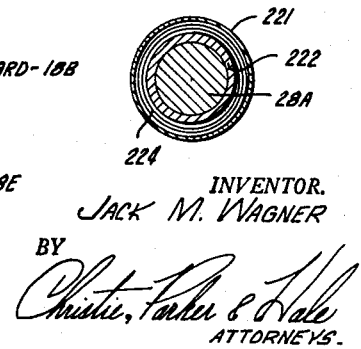
FIG. 10 is a sectional elevation of an alternate embodiment of the printing segment of the pressure roller showing a second means for permitting displacement of the roller periphery with respect to its axis of rotation.

FIG. 10 shows an alternate embodiment of the printing roller sub-assemblies in which a relatively hard outer periphery 221 is shown as concentric with a roller assembly axle 28A which supports a bearing ring 222 of the roller embodiment of FIG. 10. Between the hard outer peripheral ring 221 and the bearing ring is a coil spring or clock spring 224. The coil spring may or may not be equal in width to the width of the roller. However, a properly designed spring of this type is a resilient member which permits radial displacement of the hard outer peripheral ring with respect to the rotational axis of the roller. Thus, as the roller is brought into operation by actuation of handle 33, the periphery, which may be subject to variations of pressure due to the unevenly embossed characters of the master card, may adjust so that a relatively constant pressure is applied.

The die plate 87, which is apertured with a plurality of apertures 91 arranged in the pattern of the two pluralities 14, 14A of the data punches, is preferably a resilient sheet of alloy steel. In the operation of the device, punch carriage 12 is moved downwardly about its pivot pins 13 until latch 153 locks beneath tang 154. During this downward travel, several sub-operations take place. First, the registry pins 64, 65 pass through clearance holes 62, 63 of the first receptacle plate and into the registry holes 89 of the die plate. This sub-operation insures that apertures 91 of the die plate are in precise alignment with punches 93 and 171 of the punch sets 14 and 14A, respectively. The die plate rests with relative freedom upon protruding lips 166, 167 of the second receptacle so that it may adjust to the position imposed by registry pins 64, 65. If the master card is placed within the first receptacle so that the embossed information faces downwardly through aperture 56, the periphery of the recess in the first receptacle registers that card with exactness with respect to the punches. The invoice blank or tabulating card which is placed in second receptacle 17 beneath the first receptacle normally seats within all peripheral walls of the second receptacle. However, should it not be advanced far enough into the receptacle, the operation of the punch carriage as it approaches contact with the base thrusts the invoice blank against the peripheral registry wall 17A because of a unique registry sub-assembly 226 which is housed within a boss 227 protruding from lower surface 77 of support plate 72. A hole 228 extends at an angle of approximately 15 degrees to the vertical through the support plate and the boss. The hole is angled so that it opens at the bottom of the boss at a point farther from the center of the punch carriage than the hole enters at the top at the support plate. Therefore, a thrust pin 231 housed in the hole 228 emerges from the hole in an outward path. The thrust pin is spring loaded by a compression spring 232 which rests against a plug 233 at the top of the hole. The thrust pin has a shoulder which strikes against an inner shoulder of hole 228 so that the thrust pin is contained in the hole.

When the punch carriage approaches contact with the base, the substantially spherical exterior surface of thrust pin 231 contacts the invoice blank. At the moment of contact, the thrust pin protrudes from rectangular base 227 a certain increment. As the closing travel of the punch carriage continues, this increment decreases. The result of this decreased protrusion of the thrust pin is that the point of contact between the spherical surface of the thrust pin and the invoice blank in place in receptacle 17 moves inwardly. The frictional contact between the thrust pin and the invoice blank is such that the invoice blank is also carried inwardly so that an end 18E of the invoice blank is pushed into registry with the peripheral wall 17A of the second receptacle.

The frictional contact between the thrust pin and the invoice blank is also such that the blank is not buckled or wrinkled due to continuing thrust, since once end 18E is in registry, slippage occurs between the thrust pin and the blank.

In another operation which takes place just prior to or at the instant that latch 153 engages the tang 154, the actuating pin 117 is thrust inwardly toward the hinge line by its contact with post pin 131. As previously described, the actuating pin shifts selector plate 106 from the position shown in FIG. 5 to the position shown in FIG. 6, in which the data punches of the first plurality which have fallen through incised holes in the master card are locked in incising position within the punch carriage. Since the registry pins 64, 65 hold the die plate 87 in precise coincidence with the data hole patterns of the master card and the plurality of punches, the die plate is in position when the punch carriage is latched to insure proper transfer of the data from the master card to the invoice blank or tabulating card.

The action of the die plate is best seen in FIG. 9, where a portion of the static base has been broken away to show the position of the incising roller as it forces the die plate into incising position with the data punches which are locked in incising condition. As handle 33 is pulled rightwardly in FIG. 9, the protruding ends of roller axle 28 carry the rollers upwardly because of the track configuration and thrust the die plate upwardly against the invoice blank. The blank is thus carried upwardly against the locked data punches and the punches cut through the blank in response to the pressure of the die plate.

As graphically illustrated in FIG. 9, the resilient die plate need punch a single transverse row of data punches at one time. Because the plate is resilient, the incising pressure may be much lower and the operation much smoother. In FIG. 9, a punch 93C has been thrust through the invoice blank and partly through the die plate. However, a punch 93D is not yet operative because the resilient die plate is curved or bowed due to the fact that the incising roller has not yet exerted sufficient pressure to cause punch 93D to incise. As the roller progresses rightwardly in FIG. 9, the die plate will be pressured up against the fixed data punch 93D and the punch will then incise through the invoice blank and protrude through the die plate to effect a clean incision of the invoice blank in the proper area to transfer the data indicated by that particular punch.

In like manner, the imprinting roller sub-assembly 24 is borne upwardly by the roller axle in track 44 and contacts the invoice blank, bearing it upwardly against the embossed area of the master card as that embossing projects downwardly through aperture 56. The printing roller periphery, as previously described, is capable of radial displacement. Thus, although the periphery itself is hard enough to be effective in imprinting the information from the embossed area of the master card to the invoice blank, variations in embossing depth are compensated for by the radial displacement of the periphery with respect to the roller axis. Thus a substantially identical printing pressure is imposed upon the entire embossed area.

As the handle 33 which pulls the imprinting and incising rollers into actuating position reaches a terminal point at the right of the base, a lug 241 which protrudes inwardly from each actuating handle arm passes through apertures 34, 34A and strikes against latch 153. This thrusts the latch outwardly away from engagement with tang 154. The punch carriage is lifted upwardly away from the static base due to compression spring 189 and pin 186 so that the latch can no longer engage the tang. It is then an easy matter to continue to manually lift the punch carriage upwardly away from the base and to cause interposer bars 177 of the second plurality of data punches to fall rearwardly in their slots to the zero position illustrated in FIG. 5.

When the punch carriage lifts slightly at the end of the stroke of actuating lever 33, the die plate tends to be lifted also by its contact with the data punches which extend through it. The plate is thereby out of engagement with the pressure roller assembly as it is returned to rest position by springs 48. Thus the return springs 48 may be of a lesser loading because there is no resistance to return travel of the pressure roller assembly. The die plate is partially stripped from the punches when detent pin 186 thrusts the carriage upwardly. The plate is completely stripped from the active punches when the punch carriage is manually pivoted about pins 13, and returns to rest on lips 166, 167.

As can be seen from the foregoing description, the operation of the device from the standpoint of a sales clerk is very simple. The receptacle for the master card or credit card is the exact shape and size of the card so that once the embossed information has been made to coincide with the aperture 56, the card cannot be mislocated. The invoice blank or tabulating card is shaped to fit into receptacle 17, and the previously described thrust pin insures that the invoice blank will register properly against registry wall 17A. Registry or locating pins 64, 65 insure the proper coordination between the die plate and the pattern of data punches. The selection of the proper punches to transfer the data from the master card to the invoice blank or tabulating card is automatic and requires no care on the part of the operator. The second plurality of data punches may be visually adjusted to indicate properly the amount of the purchase. As previously indicated, although only two price punch sets have been shown, the number may be varied to accommodate the average price range of the organization using the device of the invention.

FIGS. 12 and 13 illustrate an alternate embodiment of the invention wherein the data punches of the first plurality are modified in form. In the fragmentary sectional elevation of FIG. 12, the guide block 81 with a plurality of slide paths 94, the selector plate 106, box housing 109 and weight bar 113 are all identical to like-numbered components of the previously described embodiment. However, in the embodiment of FIGS. 12 and 13 a plurality of modified data punches 251 reside in the slide paths 94 of the guide block. Each data punch 251 has a pair of notches 253, 254 spaced along a vertical side of the punch. The notches are near a locking end 255 of the punch and remote from a cutting end 257 of the punch. Notch 254 is closer to the upper or locking end of the punch.

The punch 251 is made of material which is approximately the width of slide path 94. Thus a shank 259 of the punch is in sliding contact with the walls of the slide path. However, in the area of the shank between the notches a land 261 is formed by reducing the shank thickness to less than the width of the slide path. There is an interval between the facing side of the slide path and the surface of the land.

In FIG. 12 one of the alternate punches 251A is shown oriented as if it had passed through the incised data aperture in a master card. The rest of the first plurality punches shown in FIG. 12 are in the raised position, out of punching position. Selector plate 106 is in unactuated position, not locking any of the punches in either punching or non-punching position. The configuration of the alternate punch of the invention provides means whereby the slide path may be narrowed at its top by an overhang 263, which precludes accidental removal of the punches from the slide path once the punches have been placed in the guide block. Preferably the overhang is afforded by an apertured lock plate 265 fixed to the guide block by a plurality of screws such as screws 266 and between the guide block and selector plate 106. The lock plate has a smooth upper surface so that selector plate 106 may move laterally across the surface with ease. The lock plate is apertured in the pattern of the data punches in the same manner as is selector plate 106. The apertures 268 of the lock plate 265 have the same dimensions as the transverse cross section of the data punch so that the punches may be placed through the lock plate before the plate is fixed to the guide block. The lock plate is shifted with respect to the guide block so that overhang 263 overlies the slide path an amount equal to the difference between the width of the shank at land 261 and the nominal width of the shank throughout the length of the punch.

As can be noted in FIG. 13, the preferred position of the selector plate prior to actuation is such that the trailing surface 271 of each punch aperture of the selector plate is slightly advanced over the slide path of guide block 81 and under the upper surface 273 of upper notch 254 of the punch. Such orientation precludes malfunction should the punch which has dropped through the incised hole in a master card dropped to the position where the selector plate would strike against the punch rather than enter the notch when locking the punch in position.

The above described alternate embodiment has the advantage of affording more cheaply constructed data punches. The punches can be made with only one machining operation to form the land and the notches whereas the punches of the embodiment of FIGS. 1 through 9 must be machined from thicker stock to leave the upper lip 101 of the punches 93 of the previously described embodiment. The ultimate savings would be substantial when the number of punches used in any particular punching apparatus is considered.

FIGS. 14, 15, and 16 illustrate a unique tabulating card or invoice blank set either in conjunction with the apparatus of the invention. The invoice blank or tab card set 275 is similar to the invoice blank 18 of FIG. 3 in that it comprises a tabulating card 276, a double-faced carbon sheet 277, and a translucent tissue 278. As can be seen in FIG. 14, the tissue and the card are on opposite sides of the carbon. The three components of the tab card set are fixed together in the area rightwardly of the perforations 279 of FIG. 14. It is this area in which the card, carbon and tissue are fastened together that abuts against surface 17A of the second receptacle of the device of FIGS. 1 through 9. Thus, in the illustrative embodiment, the end 281 of the tabulating card set 275 is an important registry surface. The importance of end 281 as a registry surface may vary with the particular embodiment of the apparatus of the invention. Any or all of the peripheral edges could be used to register the position of the tabulating card set or invoice blank. If a printed indicia pattern, such as the pattern 280 of FIG. 14 is located near end 281, that end is preferable as a registry surface. However, the position of the pattern is imposed by the location of the second plurality of data punches in the embodiment shown. The position of the punches can be changed to suit varying working requirements of the apparatus. Any change would cause relocation of the indicia pattern, with a concurrent change in significance of a given edge as important to registry.

The tissue and the tabulating card may each bear printed indicia patterns 280 adjacent the perforations 279 as in FIG. 14. FIGS. 14 and 16 illustrate a format of printed indicia useful for visual scanning of the information represented by incised apertures in the tissue and the card. The illustrative printing comprises four vertical columns 282, 283, 284, 285 of solid black rectangles arranged to coincide with the data punch pattern utilized by the particular tabulating account. Adjacent column 282 are digits running vertically from zero to nine. The digits represent the number value for each horizontal row of four black rectangles. In the illustrative FIG. 14 four black rectangles have been punched out leaving incised data apertures 291, 292, 293 and 294 in columns 282, 283, 284, 285, respectively. The data apertures represent the number 0825. The columns of black rectangles are headed by a row of x's separated by a decimal point and identified by a dollar sign. This symbolism might well be used where the numbers indicated by the punched holes is a sale amount. The decimal point would indicate which of the columns represented dollars and which indicated cents. Thus the sale amount punched in the card by the apparatus of FIGS. 1–9 would be readily ascertainable by reference to the digits from 0 to 9 adjacent the horizontal row punched.

While black is preferable, the rectangles may be colored with any dark color contrasting with the tissue or the tabulating card. In addition to the color rectangle in the area which will be punched out, a numeral may be imposed within the rectangle itself in the fashion shown in FIG. 16. For instance, a digit 8 is outlined in each colored rectangle 296 of the horizontal row of rectangles which are shaded to represent a black background. Similarly, adjacent the outer digit 9 the dark rectangles 297 of that horizontal row have light areas showing a 9 against the dark background. These areas may be either lighter colored printing or may be unprinted areas of the rectangle. In either of the embodiments of FIG. 14 or FIG. 16 the punched hole has a value indicated by an adjacent digit. Thus in FIG. 16 the incised data aperture 292 indicates that the numeral in that vertical column is an eight. Since aperture 292 in FIG. 14 is to the left of the decimal point indicated at the head of the columns, the value assigned the numeral 8 must be in dollars. Visual inspection of the indicia pattern of FIG. 14 indicates that $8.25 was the amount of the transaction transferred to tabulating card set 275 of FIG. 14.

The carbon paper used in set 275 is preferably of the strip or spot type. The punches tend to foul if punched many times through carbon coated paper. Therefore the preferred tabulating set has a carbon paper which is coated on both sides only from edge 298 to line 299. Punches do not penetrate this area, which need only accommodate any embossed area of the master card.

In combination with the second set 14A of data punches of the embodiment of FIGS. 1–9 the tabulating card set of FIGS. 14–16 affords visual determination of the information transferred by the apparatus of the invention. Such a combination of apparatus means that the mistakes possible from written indication on the tabulating card set of the amount of the transaction can be obviated. Much time is saved since the amount is posted and visually apparent to the customer from a single operation of the apparatus of the invention.

In addition to its simple and precise operation the invention apparatus requires a much lesser force to actuate the transfer of data from the first and second plurality of data punches and the embossed area of the master card to the invoice blank. The lessened force requirement is due substantially to the combination of a resilient shear or die plate with the apparatus of the invention. This combination does not require the entire punching and imprinting operation to be accomplished at the same instant against the pressure of all of the active punches and the embossed card. Smoother printing in insured by providing data transfer rollers which have a hard periphery which may be displaced with respect to the roller axis to accommodate variations in embossing depths on the master card.

The apparatus of the invention is such that it may be easily adapted to many uses. Data punches may be fixed in the punch carriage to identify the location of the transaction. For instance each of the service stations of a chain may be given a code number represented by a particular punch pattern on the card of the tabulating card set. Punches to incise this information could be fixed in punching position in the punch carriage. Such a set of fixed punches might supplant the second plurality of data punches 14A or might be placed in the punch carriage in addition to the first and second data punch sets. While the illustrative apparatus provides for transferring embossed and incised information at the same time it is well within the scope of the invention for either the embossed information or the incised information to be transferred separately.

Other variations in the particular illustrative apparatus may occur to those skilled in the art. However, the inventive concepts illustrated by the disclosed embodiments are not limited to the particular illustrative forms but are rather defined by the appended claims.

I claim:

1. Apparatus for incising and imprinting a blank with data at least in part derived from an embossed and incised master card and comprising a base, a punch carriage movable with respect to the base, a first receptacle for the master card, a second receptacle for the blank oriented in registry with the first receptacle, a plurality of data punches adapted to engage the master card and supported in the punch carriage, roller means for engaging the embossed portion of the card and the blank in printing relationship, means for locking certain data punches into incising position in accordance with the incised master card, roller means for effecting incising engagement between the data punches and the blank, and means for locating the master card in proper registry with the data punches during the incising operation.

2. Apparatus for recording on a blank data at least in part derived from an embossed and incised master card comprising a base, a punch carriage movable with respect to the base, means for holding the master card and the blank in common registry with the base, a plurality of data punches adapted to engage the master card and supported in the punch carriage, roller means for engaging the embossed portion of the card and the invoice blank in printing relationship, means for locking certain data punches into incising position in accordance with the incised master card, means for effecting incising engagement between the data punches and the blank, and means for locating the blank in proper registry with the data punches during the incising operation.

3. Apparatus in accordance with claim 2 in which the roller means comprises a printing roller having a resilient core, an axle movable with respect to the punches, and a substantially rigid periphery displaceable with respect to the axis of rotation of the roller.

4. Apparatus in accordance with claim 2 in which the means for locating the master card comprises hinge means linking the base and the punch carriage, a walled card receptacle in the base oriented in fixed relationship to the arcuate path of the punches in the carriage determined by the hinge means, said walled receptacle being adapted to confine the master card closely and having a bottom wall apertured to permit passage of the punches and the embossed area of the master card.

5. Apparatus in accordance with claim 2 in which the means for effecting incising engagement between the data punches and the blank comprises a resilient die plate apertured in accordance with the total punch pattern, an incising roller movable across the die plate, and a roller axle adapted to move the roller so that the roller thrusts the die plate into contact with the blank and moves the blank against the locked punches progressively across the pattern of the punches.

6. Apparatus in accordance with claim 2 in which the means for locking certain data punches into incising position comprises a guide block in the punch carriage, a slide path in the block for each data punch, a pair of notches in a side of each punch, the punches being oriented in the slide paths to extend therefrom on either side of the guide block and so that the notches of all punches face in like direction, a selector plate having apertures in accordance with the total punch pattern through which the punches extend, said plate being adapted to reciprocate in the direction of the punch notches, an actuating pin slidable in the punch carriage to move the selector plate into a notch of each punch, and means on the base for sliding the actuating pin to reciprocate the selector plate when the punches of the carriage have engaged the master card.

7. Apparatus in accordance with claim 2 in which the means for locating the blank in proper registry with the data punches comprises a walled receptacle having at least one registry wall in the base oriented with respect to the punches of the carriage, a boss extending toward the base from the carriage, a thrust pin lodged in the boss, a spring tending to impel the pin outwardly from the boss toward the base, the pin being lodged in the boss so that when the carriage and the base are in data transfer proximity the pin thrusts in a plane transverse to the direction of closure between the carriage and base, such line of thrust impinging the pin against the blank to impel the blank toward the registry wall as the base and carriage are brought together.

8. Apparatus in accordance with claim 3 in which the means for effecting incising engagement between the data punches and the blank comprises a resilient die plate apertured in accordance with the total punch pattern, an incising roller mounted on the printing roller axis, said axle being adapted to move the incising roller across the die plate so that the roller thrusts the die plate into contact with the blank and thus moves the blank against the locked punches progressively across the pattern of the punches.

9. Apparatus in accordance with claim 6 further comprising a sensing pin in the carriage, a hole in the selector plate in which the sensing pin resides, a spring loading the sensing pin toward contact with the receptacle for the master card, and a notch in the sensing pin so located with respect to the path of the pin through the selector plate that contact of the sensing pin with the master card aligns the notch with the plate so that the plate may enter the notch and lock the punches, the notch further being located so that if no master card is contacted the notch is misaligned with the selector plate so that the walls of the hole therein preclude reciprocation of the selector plate so that no punches are locked in incising position.

10. Apparatus for recording on a blank data at least in part derived from an embossed and incised master card comprising a base, a punch carriage movable with respect to the base, means for holding the master card and the blank in common registry with the base, a plurality of first data punches adapted to engage the master card and supported in the punch carriage, a plurality of second data punches adapted to contact the invoice blank and supported in the punch carriage, hinge means for guiding the carriage and the data punches therein into proper orientation with the master card in the base, roller means for engaging the embossed portion of the card and the blank in printing relationship, means for locking certain first data punches into incising position in accordance with the incised master card, means for effecting incising engagement between the first data punches and the blank, means for locking selected second data punches into incising position, means for effecting incising engagement between the second data punches and the invoice blank, and means for locating the blank in proper registry with the data punches during the incising operation.

11. Apparatus in accordance with claim 10 in which the roller means comprises a printing roller having a resilient core, an axle movable with respect to the punches, and a substantially rigid periphery displaceable with respect to the axis of rotation of the roller.

12. Apparatus in accordance with claim 10 in which the means for locating the master card comprises hinge means linking the base and the punch carriage, a walled card receptacle in the base oriented in fixed relationship to the arcuate path of the punches in the carriage determined by the hinge means, said walled receptacle being adapted to confine the master card closely and having a bottom wall apertured to permit passage of the punches and the embossed area of the master card.

13. Apparatus in accordance with claim 10 in which the means for effecting incising engagement between the data punches and the blank comprises a resilient die plate apertured in accordance with the total punch pattern, an incising roller movable across the die plate, and a roller axle adapted to move the roller so that the roller thrusts the die plate into contact with the blank and moves the blank against the locked punches progressively across the pattern of the punches.

14. Apparatus in accordance with claim 10 in which the means for locking certain first data punches into incising position comprises a guide block in the punch carriage, a slide path in the block for each data punch, a pair of notches in a side of each punch, the punches being oriented in the slide paths to extend therefrom on either side of the guide block and so that the notches of all punches face in like direction, a selector plate having apertures in accordance with the total punch pattern through which the punches extend, said plate being adapted to reciprocate in the direction of the punch notches, an actating pin slidable in the punch carriage to move the selector plate into a notch of each punch, and means on the base for sliding the actuating pin to reciprocate the selector plate when the punches of the carriage have engaged the master card.

15. Apparatus in accordance with claim 10 in which the means for locating the blank in proper registry with the data punches comprises a walled receptacle having at least one registry wall in the base oriented with respect to the punches of the carriage, a boss extending toward the base from the carriage, a thrust pin lodged in the boss, a spring tending to impel the pin outwardly from the boss toward the base, the pin being lodged in the boss so that when the carriage and the base are in data transfer proximity the pin thrusts in a plane transverse to the direction of closure between the carriage and base, such line of thrust impinging the pin against the blank to impel the blank toward the registry wall as the base and carriage are brought together.

16. Apparatus in accordance with claim 11 in which the means for effecting incising engagement between the data punches and the blank comprises a resilient die plate apertured in accordance with the total punch pattern, an incising roller mounted on the printing roller axle, said axle being adapted to move the incising roller across the die plate so that the roller thrusts the die plate into contact with the blank and thus moves the blank against the locked punches progressively across the pattern of the punches.

17. Apparatus in accordance with claim 14 further comprising a sensing pin in the carriage, a hole in the selector plate in which the sensing pin resides, a spring loading the sensing pin toward contact with the receptacle for the master card, and a notch in the sensing pin so located with respect to the path of the pin through the selector plate that contact of the sensing pin with the master card aligns the notch with the plate so that the plate may enter the notch and lock the punches, the notch further being located so that if no master card is contacted the notch is misaligned with the selector plate so that the walls of the hole therein preclude reciprocation of the selector plate so that no punches are locked in incising position.

18. In apparatus having a plurality of data punches arranged in a pattern and adapted to incise information in a blank in accordance with incised data of a master card, the combination comprising a selector plate apertured in accordance with the pattern of the plurality of data punches, means for reciprocating the selector plate with respect to the data punches extending through the selector plate apertures, a guide block, a punch slide path in the guide block for each of the plurality of data punches, each punch having a transverse cross section substantially the same as the slide path in which it lodges, a first notch in each punch, a second notch in each punch, a land formed between notches reducing the thickness of the punch between notches to less than the width of the slide path, and an overhang at an end of each slide path adjacent the selector plate reducing the size of the slide path at the point, said overhang permitting the punch to move to present each notch for engagement with the selector plate but precluding removal of each punch from the slide path of the guide block in which the punch lodges.

19. Apparatus for incising a blank with data at least in part derived from an incised master card and comprising a base, a punch carriage movable with respect to the base, a first receptacle for the master card, a second receptacle for the blank oriented in registry with the first receptacle, a plurality of data punches adapted to engage the master card and supported in the punch carriage, means for locking certain data punches into incising position in accordance with the incised master card, means for effecting incising engagement between the data punches and the blank, and means for locating the master card in proper registry with the data punches during the incising operation.

20. Apparatus according to claim 19 wherein the means for effecting an incising engagement between the data punches and the blank comprises a movable member adapted to bear the blank against the data punches as the member is displaced relative to the punches.

21. Apparatus for incising and imprinting a blank with data at least in part derived from an embossed and incised master card and comprising a base, a punch carriage movable with respect to the base, a first receptacle for the master card, a second receptacle for the blank oriented in registry with the first receptacle, a plurality of data punches adapted to engage the master card and supported in the punched carriage, movable means having a curvilinear surface adapted to engage the embossed portion of the card and the blank in printing relationship, means for locking certain data punches into incising position in accordance with the incised master card, second movable means having a curvilinear surface operable to engage the blank into incising engagement with the locked data punches, and means for locating the master card in proper registry with the data punches during the incising operation.

22. Apparatus for incising and imprinting a blank with data at least in part derived from an embossed and incised master card comprising a base, means connected to the base for securing the master card in a predetermined position relative to the base, means connected to the base for positioning the blank in a predetermined location and orientation adjacent the master card, a plurality of reciprocable punches, means for guiding the punches in their reciprocatory motion, movable mounting means for the punch guiding means operatively connected to the base, the punches being movable into a punch selection position by movement of the mounting means wherein the punches engage the master card for selection of certain ones of the punches for operation on the blank by registration with master card incisions, means connected to the punch guiding means for securing the selected punches into position for operation on the blank, and means for moving the selected punches and the blank into punching engagement.

23. Apparatus for incising and imprinting a blank with data at least in part derived from an incised master card comprising a base, means connected to the base for securing the master card in a predetermined position relative to the base, means connected to the base for positioning the blank in a predetermined location and orientation adjacent the master card, a plurality of reciprocable punches, means for guiding the punches in their reciprocatory motion, mounting means for the punch guiding means operatively connected to the base for relative movement between the punch guiding means and the base, relative movement between the punch guiding means and the base moving the punches into a punch selection position wherein the punches engage the master card for selection of certain ones of the punches for operation on the blank by registration with master card incisions, means connected to the punch guiding means for securing the selected punches into position for operation on the blank, and means movable parallel to the master card for engaging the selected punches into punching relation with the blank.

24. Apparatus according to claim 23 wherein the master card includes an embossed data portion, the apparatus including means for engaging the embossed portion of the master card with the blank under pressure for transfer of the embossed data of the master card to the blank.

25. Apparatus according to claim 23 wherein the means for moving the seelcted punches and the blank into punching relation comprises a flexible perforate member disposed adjacent the blank opposite from the master card, and a roller means disposed in the base adjacent the perforate member opposite from the blank and movable parallel to the master card, wherein movement of the roller means relative to the base displaces the flexible perforate member toward the selected punches for punching engagement of the punches with the blank.

References Cited in the file of this patent

UNITED STATES PATENTS

| | | |
|---|---|---|
| 1,430,014 | Hyman | Sept. 26, 1922 |
| 1,827,180 | Williams | Oct. 13, 1931 |
| 1,830,779 | Boulton | Nov. 10, 1931 |
| 2,368,531 | Erickson et al. | Jan. 30, 1945 |
| 2,803,187 | Hart et al. | Aug. 20, 1957 |
| 2,832,611 | Prosser | Apr. 29, 1958 |
| 2,909,221 | Hopp | Oct. 20, 1959 |